(12) United States Patent
Renzi

(10) Patent No.: US 9,229,882 B2
(45) Date of Patent: Jan. 5, 2016

(54) SYSTEM FOR BACKING UP AND RESTORING THE FUNCTIONALITIES OF AN INFORMATION TECHNOLOGY SYSTEM

(71) Applicant: Alberto Renzi, Moltrasio (IT)

(72) Inventor: Alberto Renzi, Moltrasio (IT)

( * ) Notice: Subject to any disclaimer, the term of this patent is extended or adjusted under 35 U.S.C. 154(b) by 213 days.

(21) Appl. No.: 13/740,360

(22) Filed: Jan. 14, 2013

(65) Prior Publication Data

US 2013/0185533 A1    Jul. 18, 2013

(30) Foreign Application Priority Data

Jan. 13, 2012    (IT) .............................. MI2012A0030

(51) Int. Cl.
*G06F 9/00*     (2006.01)
*G06F 12/16*    (2006.01)
*G06F 11/14*    (2006.01)

(52) U.S. Cl.
CPC ............ *G06F 12/16* (2013.01); *G06F 11/1461* (2013.01); *G06F 11/1464* (2013.01); *G06F 11/1469* (2013.01)

(58) Field of Classification Search
CPC ............ G06F 11/1461; G06F 11/1464; G06F 11/1469; G06F 12/16
USPC .............................................. 711/162; 713/1
See application file for complete search history.

(56) References Cited

U.S. PATENT DOCUMENTS

| | | | | |
|---|---|---|---|---|
| 5,572,402 | A | * | 11/1996 | Jeong ........................ 361/679.31 |
| 6,926,199 | B2 | * | 8/2005 | Jay et al. ........................ 235/375 |
| 7,080,051 | B1 | * | 7/2006 | Crawford ....................... 705/400 |
| 7,536,598 | B2 | * | 5/2009 | Largman et al. ................ 714/36 |
| 2008/0104148 | A1 | | 5/2008 | Schwaab et al. |
| 2011/0202505 | A1 | | 8/2011 | Sugahara |

OTHER PUBLICATIONS

Charlie Russel, Craig Zacker, Windows Server Team at Microsoft., Introducing Windows Server 2008 R2, 2009, Microsoft Pres , p. 92, 99 and 130.*
European Search Report for corresponding application EP13150942; Mail date Mar. 18, 2013.

* cited by examiner

*Primary Examiner* — Chun Cao
(74) *Attorney, Agent, or Firm* — Cantor Colburn LLP

(57) ABSTRACT

A system for backing up and restoring the functionalities of an information technology system which comprises an electronic computer, the electronic computer comprising elements for accessing the data communications network, a first hard disk, a removable slider which is adapted to contain the first hard disk, a first data bank; an operations center being adapted to retrieve instructions from the data bank which are adapted to be processed by the computer on the basis of a unique identifier associated with the electronic computer, the computer being further adapted to perform operations for backing up a restore point on elements for backing up data which are present on the first hard disk, on the basis of the instructions, and operations for restoring the data on the first hard disk on the basis of a choice made by a user.

14 Claims, 3 Drawing Sheets

SYSTEM FOR BACKING UP AND RESTORING THE FUNCTIONALITIES OF AN INFORMATION TECHNOLOGY SYSTEM

The present invention relates to a system for backing up and restoring data, in particular a system for restoring the functionality of an electronic computer.

BACKGROUND OF THE INVENTION

Backing up data and restoring it following a software or hardware error constitutes one of the greatest challenges that a company has to face. A malfunction, caused for example by a computer virus, can render an employee's workstation completely unusable and result in considerable losses of time and money. Such outages can be due to a malfunction of a hardware component, such as a hard disk crash, or of a software component, such as the corruption of the operating system or of applications, but they can also be due to involuntary actions and, last but not least, to incompatibilities between newly-installed programs and pre-existing programs.

In some cases, the user is not capable of ascertaining the exact cause of the malfunction and has to execute (or obtain) technical support services for restoring the functionality of the information technology system. The technical support services can take a long time, be complex, costly and in some cases difficult to obtain as well. Often the technical support services are limited to replacing the non-functioning hardware device. In order to render the system operational again, it is necessary to reinstall the operating system and all the programs with their configurations, i.e. the set of customizations that each user makes to his own system in order to improve its usability is not taken into consideration by this process. Normally, hardware technical support is limited to replacing the faulty part, and installation of the operating system and programs is left to the user.

Normal use by a user of an information technology system generally involves the progressive accumulation thereon of data and programs associated with the work activity such as passwords, preferences, settings or combinations thereof. This means that in order to render a compromised system usable once again, it is not sufficient to restore its mere functionality and instead it would be preferable to bring it to the conditions preceding the onset of the malfunction.

The use of "mirroring" based on the use of RAID 1 configurations is effective in the event of breakage of one of the two hard disks, since it comprises two mirror-symmetrical copies. This method however is not suitable in the event of malfunctioning software, such as the involuntary deletion of an important file or the malfunctioning caused for example by a computer virus, which would be mirrored on the other disk. Even RAID 5 systems with multiple disks, which are capable of reconstructing the disk that might fail, are unsuitable when faced with such events, and for this reason such architectures must be supplemented with systems for backing up. Such systems are widely available on the market but they have the disadvantage of requiring intervention by the user, who has to decide when to make a copy to back up the system, where to do it, and what data to save. Similar problems occur if it is desired to migrate from one computer to another one that is considered more efficient, since this operation can require a considerable amount of time.

SUMMARY OF THE INVENTION

The aim of the present invention is to overcome the above-mentioned drawbacks of the known art by providing a system that is capable of restoring the functionality of an information technology system in a short time.

Within this aim, an object of the present invention is to provide a system that is capable of restoring the functionality of an information technology system which is efficient, and low-cost.

This aim and these and other objects which will become more apparent hereinafter are all achieved by a system according to claim 1.

Advantageously, the system obtained performs the restoration operations without the assistance of designated staff.

Conveniently, the periodic operations of monitoring the system occur in a manner that is entirely transparent to the user.

Preferably, the system does not require the use of costly devices and is integrated with the hardware and software systems available on the market.

Advantageously the system will enable migration from one computer to another in a short time.

BRIEF DESCRIPTION OF THE DRAWINGS

Further characteristics and advantages of the invention will become more apparent from the detailed description that follows, given in the form of a non-limiting example with accompanying drawings wherein.

DESCRIPTION OF THE PREFERRED EMBODIMENTS

Figure 1:
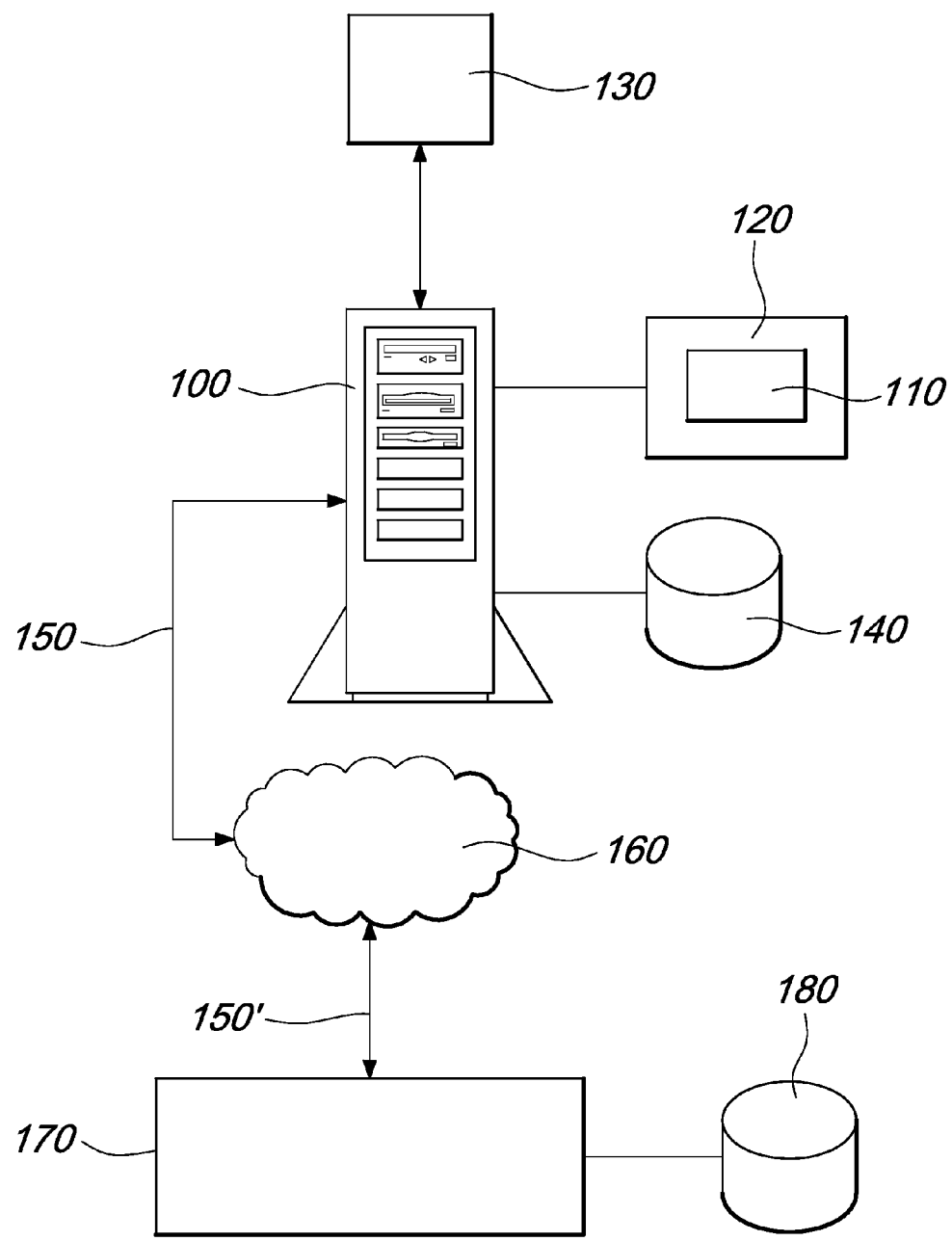
FIG. 1 is a block diagram of the system according to the present invention.

An illustrative example of the system of the present invention is summarized in the block diagram in FIG. 1.

The system shown comprises an electronic computer 100 and an operations center 170 which are mutually connected by means for interconnection 150 and 150' and a data communications network 160.

The electronic computer 100 is conventional and comprises both hardware and software components, such as for example a plurality of operating systems and dedicated applications which are adapted to receive, process and display the data entered by the user. The electronic computer 100 further comprises a slider 120, a first hard disk 110 and a first database 140.

The first hard disk 110 is conventional and is provided preferably in the form of magnetic or solid state disks. The first hard disk is divided into two partitions. The first (generally "C):") contains a first operating system that is adapted to interface with the applications normally used and configurable by the user. The second partition (for data, named "A:") contains all the files and documents used by the user. The removable slider 120 is constituted by a guide into which the first hard disk 110 can be inserted and removed with ease. Conveniently the slider is adapted in such a way as to enable the operation of inserting the hard disk and connecting it to the computer 100 in a quick and easy manner. The person skilled in the art will understand easily that such a slider 120 can be adapted to enable the insertion of hard disks available on the market. The backup means 130 are adapted to contain the data stored on the first hard disk 110 but have a fixed structure i.e. they are arranged in such a way as not to be immediately accessible by the user. Conveniently such backup means 130 are provided by way of a second hard disk which is arranged within the chassis of the computer 100, and have a data storage capacity that exceeds that of the first hard disk 110. Alternatively such backup means 130 can be provided by way of a device connected to the local network, or a server on the local network, or a device located at a remote geographical site and connected to the electronic computer (100) by way of a cloud computing architecture. The data banks 140 and 180 are conventional and are adapted to keep information such as commands and schedules stored.

The remote management system 170 can be provided by using a framework of processes and procedures and is adapted to interface with a plurality of electronic processing units 100 and is capable of performing computations on the basis of information supplied to it by the electronic computer 100 in order to monitor its status. The remote management system 170 moreover has a second data bank 180. The second data bank 180 is conventional and is adapted to store information relating to each individual computer. The electronic computer 100 is identified by the remote management system 170 by way of a number.

Figure 2:
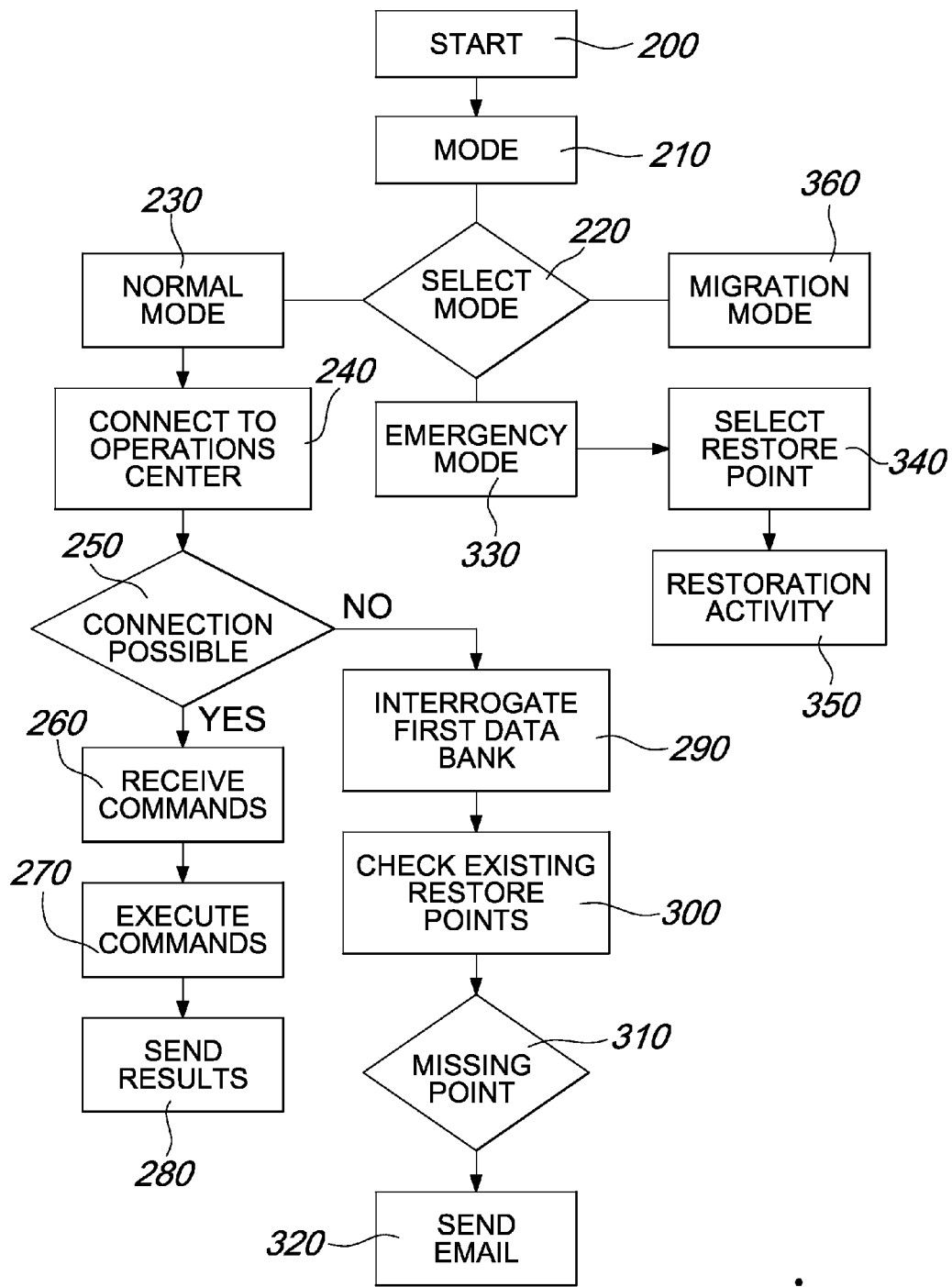
FIG. 2 is a flowchart that explains an aspect of the system in FIG. 1 in greater detail.

With reference to the flowchart in FIG. 2, a flowchart of the operation of the system according to the invention will now be explained.

In step 200 the computer is powered up and the user, under normal operating conditions, is shown a screen by the second operating system present on the backup means 130 in which it is possible to choose between three modes of operation, normal, emergency and migration. The person skilled in the art will understand easily that it is possible to set a timeout by which such choice must be made, and once this elapses the system will automatically select normal mode.

If the choice is normal mode (step 230), the system will try to connect to the operations center 170. If the connection is possible, step 250, the system awaits commands originating from the operations center. Such commands establish when to clone the "C:" partition and when to clone the "A:" partition of the first hard disk 110, and make a copy of them on the backup means 130. Preferably this copy is provided in the form of an "image", i.e. by organizing the plurality of information to be backed up in a single file. The person skilled in the art will understand easily that this process can be made more efficient by using common data transfer optimization techniques, such as the use of incremental copies rather than total or compressed copies. Optionally where security is required such copies can also be encrypted. Each one of these copies is uniquely identified by way of an identifier which is constituted by the number of the system and the date and time when the image was made. Conveniently the backing up of restoration copies could occur at well-specified intervals so as to have for example a copy for each hour of the current day, one for each day of the week and one for each week of the month.

Moreover such commands can involve the performance of additional activities such as antivirus scanning, removal of malicious code, updating of programs or their installation, optimization of the hard disk by way of for example defragmentation, and automatic shutdown of the computer 100. In step 270 the commands are executed in a manner that is entirely transparent to the user who is using the computer 100. In step 280 the outcome of such operations is sent to the operations center which updates the n-tuple corresponding to such commands. Upon reception of such information, the operations center identifies, in the second database 180, the n-tuple corresponding to the unique identifier of the electronic computer, indicating the outcome of the execution of the commands and the date and time when they were executed. A similar operation to update the database is executed on the first data backup 140. If connection to the operations center 170 is not possible, step 290, then the electronic computer 100 interrogates the first local data bank 140 which contains, updated to the most recent successful connection, the commands to be executed with the associated scheduling. Preferably a few minutes after powering up, a check is performed on the backup means of the date of the most recent missing restore point. In step 310 a check is performed to see if there are any restore points missing from the backup means 130 and if so, in step 320 the command is launched to perform a save and if this is not successful a notification email is sent, if the connectivity allows it, to the operations center 170.

In step 330 the operation mode selected is emergency mode. In this case a software problem has arisen and is such as to render the electronic computer 100 partially or completely unusable. For example a virus might have rendered the operating system unusable, important data has been accidentally deleted, or some recently-installed applications are incompatible with previously-existing applications. In this case, step 330, the user chooses the emergency mode. In step 335 the system offers different modes of restoration: restoration of the partition of the operating system ("C:") or restoration of the data partition ("A:"). In step 340, in case of restoration of the operating system (the "C:" partition), the user selects the desired restore point corresponding to a system configuration that is known to work or, in case of restoration of data (the "A:" partition), the set corresponding to the desired point in time. In step 350 the restoration activity begins and involves a transfer of data from the backup means 130 to the first hard disk 110. Conveniently the restoration of operations of the electronic computer is achieved in about fifteen minutes.

In step 360 the user selects the migration mode. This mode is selected when the slider and the first hard disk are removed from the computer and inserted into another computer 100'.

Figure 3:
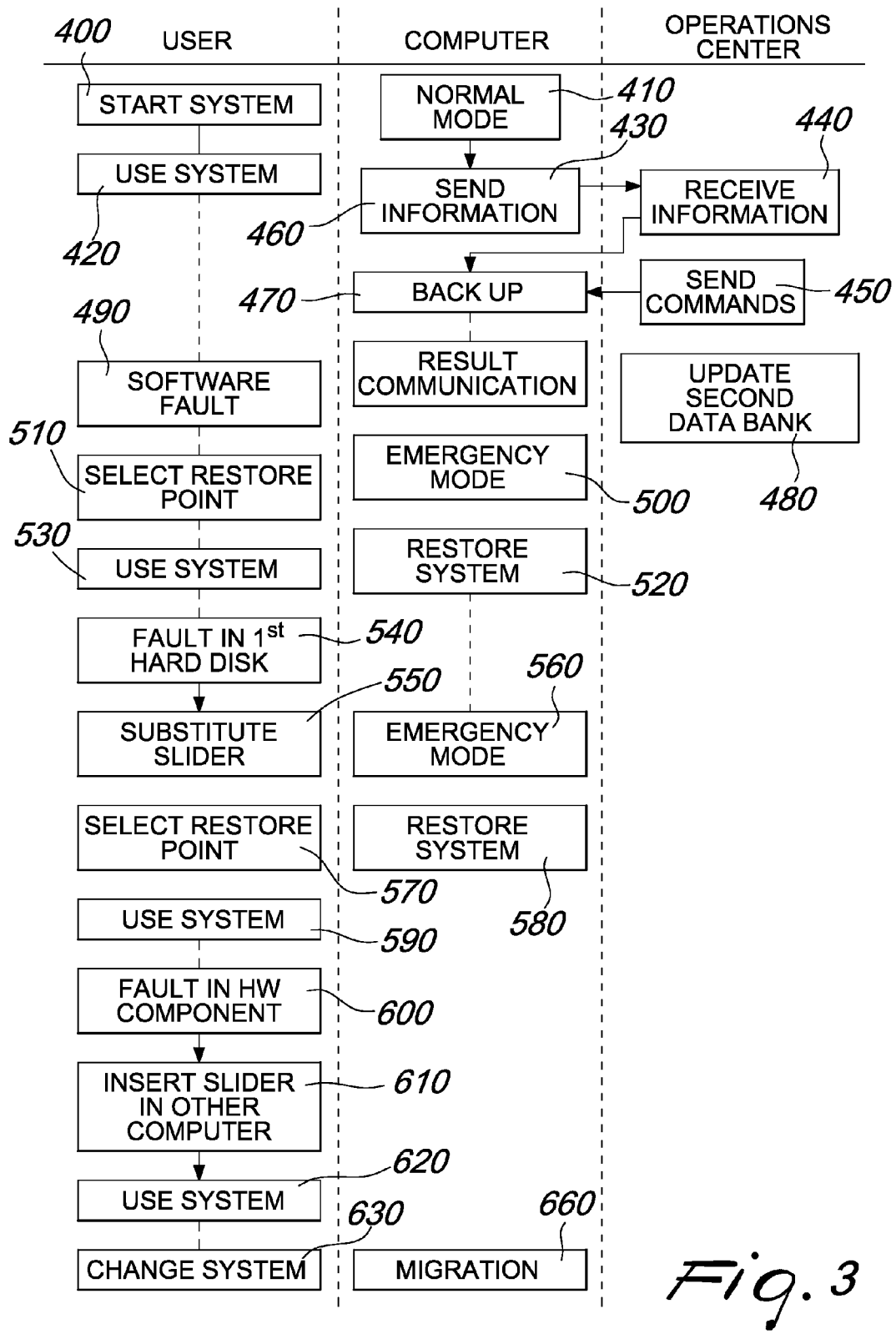
FIG. 3 explains the operation of the system according to the invention in FIG. 1.

FIG. 3 shows a flowchart that explains the operation of the system according to the present invention and provides more detail about the operations that are performed by the user and the operations generated by the electronic computer 100 and by the operations center 170.

In step 400 the user decides to start up the system. On the screen of the electronic computer 100 appears the list of modes of operation. In step 410, the user selects normal mode. In step 420, the user uses the information technology system. Simultaneously in step 430 the electronic computer 100 sends information, which is useful for determining the status of the system, to the operations center 170. In step 440 the operations center 170 processes the commands that it has received, interrogates the second data bank 180 and responds by sending the commands in step 450. The computer starts the backup, step 460, which involves a transfer of data between the first hard disk 110 and the backup means 130. In step 470 the outcome of such operations is notified to the operations center 170 which in step 480 updates the second database 180.

In step 490, during for example the normal use of the computer 100, a software malfunction arises. The user reboots the operating system and selects, in step 500, the emergency mode. In step 520 the user chooses, from a list, the restore point that he or she considers suitable. In step 520 the restoration operations begin. These operations involve copying the data contained in the backup means 130 onto the first hard disk 110. Once this operation has been concluded, the system is totally restored and can be used by the user, step 530. In step 540 a malfunction of the first hard disk arises.

This type of malfunction is easily identifiable by the user because for example it makes it impossible to boot the operating system and it often results in error messages to this effect being displayed on the screen. In step 550 the user substitutes the slider 120 with another available one, and boots the system which automatically enters emergency mode, step 560. In step 570 the user chooses the restore point that he or she considers most suitable and in step 580 the restoration operations begin which make possible, in a short time, full usability of the system step 590. In step 600 a hardware component other than the first hard disk fails. In this case, step 610, the user takes out the slider and the first hard disk and inserts it into another computer 100' equivalent to the first. In step 620 the user can use the system immediately.

If the electronic computer is to be substituted with a new one, the user takes out the slider 120 and inserts it into the new system, step 630. The new computer is booted and the migration mode is selected, thus enabling the new system to be recognized and used within a short time, step 660.

Thus it has been shown that the method and the system as described achieve the intended aim and objects. In particular, it has been shown that the system thus conceived makes it possible to overcome the qualitative drawbacks of the known art.

Clearly, numerous modifications are evident and can be readily executed by the person skilled in the art without extending beyond the scope of protection of the present invention.

Hence, the scope of protection of the claims shall not be limited by the explanations or by the preferred embodiments illustrated in the description by way of examples, but rather the claims shall comprise all the patentable characteristics of novelty that reside in the present invention,
including all the characteristics that would be considered as equivalent by the person skilled in the art.

The disclosures in Italian Patent Application No. MI2012A000030 from which this application claims priority are incorporated herein by reference.

What is claimed is:

1. A system for backing up and restoring functionalities of an information technology system, comprising:
    a data communications network;
    an electronic computer, said electronic computer comprising a first connection for accessing said data communications network, a first hard disk, a removable slider removably arranged in said electronic computer and removably containing said first hard disk, and a first data bank storing instructions for execution by said electronic computer;
    a remote operations center, said operations center comprising a second connection for accessing said data communications network and a second data bank, said operations center being configured to retrieve from said second data bank instructions to be sent to and processed by said electronic computer on a basis of a unique identifier associated with said electronic computer; and
    a data backup device,
    said electronic computer being configured to:
        perform operations for backing up, on said data backup device as backed-up data, data stored in said first hard disk, either on a basis of said instructions received from said remote operations center, or in a case where a connection between said electronic computer and said remote operations center is not possible on a basis of said instructions stored in said first data bank, said data that is backed-up on said backup device being associated with a restore point, and
        restore the backed-up data on the first hard disk on the basis of a choice made by user.

2. The system according to claim 1, wherein the backup device comprises:
    a second hard disk arranged inside the electronic computer, or
    a device connected to the local network, or
    a server on the local network, or
    a device arranged in a remote geographical site and connected to the electronic computer by means of a cloud computing architecture.

3. The system according to claim 2, wherein the electronic computer is configured to schedule operations on the first hard disk and the backup device on the basis of said instructions.

4. The system according to claim 3, wherein said scheduled operations on the first hard disk further comprise the removal of malicious code, antivirus scans, the updating of programs installed on the electronic computer, defragmentations, the automatic installation of programs, the shutdown of the electronic computer.

5. The system according to claim 3, wherein the second data bank comprises a plurality of stored instructions which are indexed on the basis of said unique identifier associated with said electronic computer and wherein the first data bank is configured to store said plurality of stored instructions and the scheduled operations associated with said plurality of instructions.

6. The system according to claim 2, wherein the remote operations center configured to store in the second data bank instructions associated with said electronic computer which are indexed on the basis of said unique identifier associated with said electronic computer.

7. The system according to claim 1, wherein the choice is made by the user on the basis of information contained in the backup device.

8. The system according to claim 7, wherein the choice made by the user allows the loading of the operating system installed on the first hard disk, the checking of the connectivity to the remote operations center, the reception of instructions, the scheduling of operations associated with said instructions, the sending of the outcome of these operations.

9. The system according to claim 7, wherein the choice made by the user allows the loading of the operating system installed on the first hard disk, the checking of the presence, on the backup device, of the restore checkpoints scheduled on the basis of the instructions received from the remote operations center and contained in the first data bank.

10. The system according to claim 7, wherein the choice made by the user provides to identify said restore point and to copy the image associated with said restore point onto the first hard disk.

11. The system according to claim 7, wherein the choice made by the user provides to render operational a second electronic computer in which the removable slider and the corresponding first hard disk of the first electronic computer have been installed.

12. A method for backing up and restoring the functionalities of an information technology system, comprising the steps of:
    providing a data communications network;
    providing an electronic computer equipped with a first connection for accessing the data communications network, a first hard disk, a removable slider removably arranged in said electronic computer and removably containing said first hard disk, and a first data bank storing instructions for execution by said electronic computer;

providing a remote operations center comprising a second connection for accessing the data communications network and a second data bank;

providing a data backup device;

accessing, by means of said remote operations center, said second data bank;

retrieving, by way of said remote operations center, from said second data bank, instructions and sending said instructions to said electronic computer for processing by said electronic computer on the basis of a unique identifier associated with said electronic computer;

performing, by means of said electronic computer, operations for backing up, on said backup device as backed-up data, data stored in said first hard disk, either on a basis of said instructions received from said remote operations center, or in case that a connection between said electronic computer and said remote operations center is not possible on a basis of said instructions stored in said first data bank, said data that is backed-up on said backup device being associated with a restore point;

restoring the backed-up data on the first hard disk on the basis of a choice made by a user.

13. The method according to claim 12, further comprising the step of scheduling, by means of said electronic computer, operations on the first hard disk and the backup device on the basis of said instructions.

14. The method according to claim 12, further comprising the step of storing, in the second data bank, instructions associated with said electronic computer and indexed on the basis of said unique identifier associated with said electronic computer.

* * * * *